US012393687B2

(12) United States Patent
Moissinac et al.

(10) Patent No.: US 12,393,687 B2
(45) Date of Patent: Aug. 19, 2025

(54) TECHNIQUES FOR DETECTING COMMAND INJECTION ATTACKS

(71) Applicant: Okta, Inc., San Francisco, CA (US)

(72) Inventors: Béatrice Ségolène Marie Moissinac, White Plains, NY (US); Kimberly Jane Nowell-Berry, Palm City, FL (US)

(*) Notice: Subject to any disclaimer, the term of this patent is extended or adjusted under 35 U.S.C. 154(b) by 329 days.

(21) Appl. No.: 18/049,167

(22) Filed: Oct. 24, 2022

(65) Prior Publication Data

US 2024/0134974 A1 Apr. 25, 2024
US 2024/0232345 A9 Jul. 11, 2024

(51) Int. Cl.
*G06F 21/56* (2013.01)

(52) U.S. Cl.
CPC ...... *G06F 21/563* (2013.01); *G06F 2221/033* (2013.01)

(58) Field of Classification Search
CPC .......... G06F 21/563; G06F 2221/033
See application file for complete search history.

(56) References Cited

U.S. PATENT DOCUMENTS

| | | | | |
|---|---|---|---|---|
| 8,726,254 B2* | 5/2014 | Rohde | ................. | G06F 11/3604 717/154 |
| 10,382,448 B2* | 8/2019 | Nguyen-Tuong | ............................ | H04L 63/1466 |
| 2005/0273854 A1* | 12/2005 | Chess | ................... | G06F 21/577 713/188 |
| 2009/0150374 A1* | 6/2009 | Dewey | .................. | G06F 21/562 707/999.005 |
| 2011/0252475 A1* | 10/2011 | Mui | ..................... | H04L 63/1483 726/23 |
| 2014/0096227 A1* | 4/2014 | Barbara | .................. | H04L 63/02 726/11 |
| 2017/0139393 A1* | 5/2017 | Boss | ..................... | G05B 19/058 |
| 2019/0081980 A1* | 3/2019 | Luo | ......................... | G06N 20/00 |
| 2020/0097587 A1* | 3/2020 | Klein | .................. | G06F 16/2462 |
| 2021/0211459 A1* | 7/2021 | Kanemoto | .......... | H04L 63/1491 |
| 2021/0367873 A1* | 11/2021 | Aurelio | ................. | H04L 65/612 |
| 2023/0251834 A1* | 8/2023 | Tao | ........................... | G06F 8/36 717/106 |
| 2024/0022600 A1* | 1/2024 | Zhang | ................. | H04L 63/1466 |
| 2024/0028740 A1* | 1/2024 | Chan | ..................... | G06F 21/577 |
| 2024/0214417 A1* | 6/2024 | Kuroki | ............... | H04L 63/1458 |

* cited by examiner

*Primary Examiner* — Hieu T Hoang
(74) *Attorney, Agent, or Firm* — Holland & Hart LLP

(57) ABSTRACT

Methods, systems, and devices for managing requests are described. A software platform may receive a request associated with a first programming language. The software platform may determine a first mixture associated with the request. The first mixture may be based on a first language model corresponding to the first programming language. The software platform may determine a second mixture associated with the request. The second mixture may be based on a second language model corresponding to a second programming language. The second programming language may be different from the first programming language. The software platform may execute or refrain from executing the request based on the first mixture and the second mixture.

20 Claims, 9 Drawing Sheets

TECHNIQUES FOR DETECTING COMMAND INJECTION ATTACKS

FIELD OF TECHNOLOGY

The present disclosure relates generally to database systems and data processing, and more specifically to techniques for detecting command injection attacks.

BACKGROUND

A software application may request a user to log into an account using authentication information, such as a combination of a username and a password. Users who have accounts for several different applications must therefore remember several different usernames and passwords. Additionally, or alternatively, the necessity of separately logging in to each application may impose a considerable burden on a user, who must enter usernames and passwords for each application used. In some cases, a user may use a software platform to help manage contacts or other identifying information associated with accounts for accessing software applications through login requests. However, for some use cases, conventional techniques for managing login requests may be deficient or sub-optimal in some current configurations.

SUMMARY

The described techniques relate to improved methods, systems, devices, and apparatuses that support techniques for detecting command injection attacks. For example, the described techniques provide a framework for detecting command injection attacks using programming language models developed using natural data sets. In some examples, a software platform may receive a request associated with a first programming language. In such examples, the software platform may determine a first mixture associated with the request. The first mixture may be based on a first language model corresponding to the first programming language. Additionally, or alternatively, the software platform may determine a second mixture associated with the request. In some examples, the second mixture may be based on a second language model corresponding to a second programming language. For example, the second programming language may be different from the first programming language. In some examples, the software platform may execute or refrain from executing the request based on the first mixture and the second mixture. Executing or refraining from executing the request based on the first mixture and the second mixture may lead to increased security at the software platform, among other possible benefits.

A method for managing requests at a device is described. The method may include receiving, at a software platform of the device, a request associated with a first programming language, determining a first mixture associated with the request, where the first mixture is based on a first language model corresponding to the first programming language, determining a second mixture associated with the request, where the second mixture is based on a second language model corresponding to a second programming language different from the first programming language, and executing or refraining from executing the request based on the first mixture and the second mixture.

An apparatus for managing requests at a device is described. The apparatus may include a processor, memory coupled with the processor, and instructions stored in the memory. The instructions may be executable by the processor to cause the apparatus to receive, at a software platform of the device, a request associated with a first programming language, determine a first mixture associated with the request, where the first mixture is based on a first language model corresponding to the first programming language, determine a second mixture associated with the request, where the second mixture is based on a second language model corresponding to a second programming language different from the first programming language, and execute or refrain from executing the request based on the first mixture and the second mixture.

Another apparatus for managing requests at a device is described. The apparatus may include means for receiving, at a software platform of the device, a request associated with a first programming language, means for determining a first mixture associated with the request, where the first mixture is based on a first language model corresponding to the first programming language, means for determining a second mixture associated with the request, where the second mixture is based on a second language model corresponding to a second programming language different from the first programming language, and means for executing or refraining from executing the request based on the first mixture and the second mixture.

A non-transitory computer-readable medium storing code for managing requests at a device is described. The code may include instructions executable by a processor to receive, at a software platform of the device, a request associated with a first programming language, determine a first mixture associated with the request, where the first mixture is based on a first language model corresponding to the first programming language, determine a second mixture associated with the request, where the second mixture is based on a second language model corresponding to a second programming language different from the first programming language, and execute or refrain from executing the request based on the first mixture and the second mixture.

Some examples of the method, apparatuses, and non-transitory computer-readable medium described herein may further include operations, features, means, or instructions for determining, based on the first language model and the second language model, whether the request includes a respective one or more programming tokens corresponding to the first programming language or the second programming language, or both, where determining the first mixture and the second mixture may be based on whether the request includes the respective one or more programming tokens.

In some examples of the method, apparatuses, and non-transitory computer-readable medium described herein, determining whether the request includes the respective one or more programming tokens may include operations, features, means, or instructions for determining, based on the first language model, that the request includes a first programming token corresponding to the first programming language, where the first mixture may be based on a first weight associated with the first programming token and determining, based on the second language model, that the request includes a second programming token corresponding to the second programming language, where the second mixture may be based on a second weight associated with the second programming token.

In some examples of the method, apparatuses, and non-transitory computer-readable medium described herein, executing or refraining from executing the request may include operations, features, means, or instructions for determining whether the first mixture satisfies a first threshold, determining whether the second mixture satisfies a second threshold, and executing or refraining from executing the request may be based on the first mixture satisfying the first threshold or the second mixture satisfying the second threshold, or both.

Some examples of the method, apparatuses, and non-transitory computer-readable medium described herein may further include operations, features, means, or instructions for determining the first threshold and the second threshold based on non-linear association between the first mixture and the second mixture.

Some examples of the method, apparatuses, and non-transitory computer-readable medium described herein may further include operations, features, means, or instructions for performing, at the software platform of the device, a training operation using a machine learning model, where the first language model and the second language model may be based on the training operation.

In some examples of the method, apparatuses, and non-transitory computer-readable medium described herein, the machine learning model includes a topic model.

Some examples of the method, apparatuses, and non-transitory computer-readable medium described herein may further include operations, features, means, or instructions for obtaining a first set of data associated with the first programming language and a second set of data associated with the second programming language and identifying a first set of programming tokens based on the first set of data and a second set of programming tokens based on the second set of data, where the first language model includes the first set of programming tokens and the second language model includes the second set of programming tokens.

Some examples of the method, apparatuses, and non-transitory computer-readable medium described herein may further include operations, features, means, or instructions for assigning a respective weight to each token of the first set of programming tokens based on a respective frequency at which each token of the first set of programming tokens occurs within the first set of data and assigning a respective weight to each programming token of the second set of programming tokens based on a respective frequency at which each programming token of the second set of programming tokens occurs within the second set of data.

In some examples of the method, apparatuses, and non-transitory computer-readable medium described herein, each programming token of the first set of programming tokens and the second set of programming tokens includes a keyword, an operator, or a delimiter.

DETAILED DESCRIPTION

Figure 1:
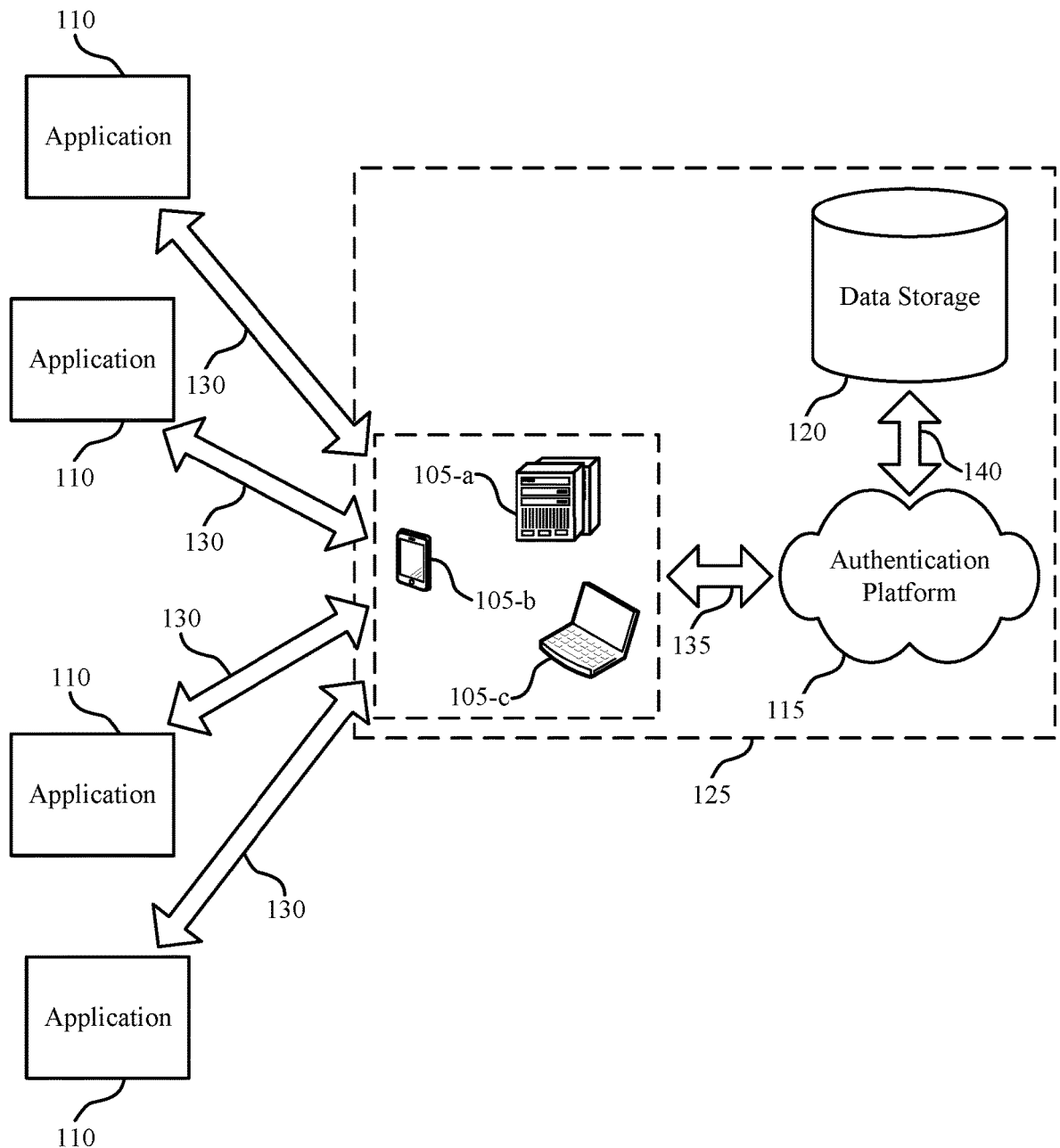
FIG. 1 illustrates an example of a system that supports techniques for detecting command injection attacks in accordance with aspects of the present disclosure.

A user may use a software platform to manage identifying information associated with the user, such as personal information, contact information, payment information, account information, or any combination thereof. For example, the user may use the software platform to authenticate and authorize access to the identifying information as part of a login request. The software platform may be stored locally at a device of the user (e.g., a client device) or implemented as a cloud platform that may be accessed using a cloud client. In some examples, as part of the login request, the user may exchange information with the software platform. For example, in response to receiving the login request, the software platform may output some information to the user. In some examples, the software platform may experience malicious attacks in which the user (e.g., an attacker) may attempt to gain unauthorized access to information stored at the software platform (e.g., stored at a server associated with the software platform) using the login request. For example, the attacker may inject malicious code (e.g., a command) into the login request that, if executed at the software platform, may enable the attacker to gain unauthorized access to identifying information associated with other users.

In some examples, the login request and the injected command may include code that corresponds to different programming languages. For example, the login request may include code (e.g., expected code, code associated with the login request) that corresponds to a first programming language (e.g., one of hypertext transfer protocol (HTTP), structured query language (SQL), JavaScript, extensible markup language (XML), and XML, external entity (XXE)). Additionally, or alternatively, the injected command may include code (e.g., unexpected code, code unassociated with the login request) that corresponds to a second programming language (e.g., another of HTTP, SQL, JavaScript, XML, and XXE). Some techniques for detecting command injection attacks may rely on synthetic data (e.g., data collected from artificially generated command injection attacks) to identify whether a request includes expected or unexpected code (or both). In some examples, however, such techniques may be susceptible to false positives, for example due to words (or combinations of words) being common to multiple programming languages. For example, techniques that rely on synthetic data may identify a combination of words corresponding to the second programming language as a command injection attack, irrespective of whether the combination of words also corresponds to the first programming language.

Various aspects of the present disclosure relate to techniques for detecting command injection attacks using natural data sets. For example, a software platform may support techniques for detecting command injection attacks using programming language models (e.g., language models) developed using natural data sets (e.g., data collected from previously detected command injection attacks). In some examples, the software platform may receive a login request from a user that is associated with the first programming language (e.g., the programming language associated with the login request). For example, the login request may be an HTTP request and the first programming language may be HTTP. In such an example, the software platform may use an HTTP language model to determine an HTTP mixture associated with the request. The HTTP mixture may correspond to distribution of HTTP language features within the HTTP request. Additionally, or alternatively, the software platform may use one or more other language models (e.g., corresponding to one or more other programming languages) to determine mixtures (e.g., distributions) of other languages that may be included in the HTTP request. For example, the software platform may use an SQL language model to determine an SQL mixture associated with the HTTP request. The software platform may execute (or refrain from executing) the HTTP request based on the HTTP mixture and the SQL mixture (or one or more other mixtures determined for the HTTP request). That is, the software platform may use the HTTP mixture and the SQL mixture to determine whether the HTTP request may be innocuous or malicious (e.g., suspicious or belligerent).

Aspects of the subject matter described herein may be implemented to realize one or more of the potential advantages. For example, the techniques employed by the software platform may provide benefits and enhancements to defense mechanisms for command injection attacks. Aspects of the disclosure are initially described in the context of a system for distributed computing. Aspects of the disclosure are also described in the context of a language model development procedure, a command injection detection procedure, and a process flow. Aspects of the disclosure are further illustrated by, and described with reference to, apparatus diagrams, system diagrams, and flowcharts that relate to techniques for detecting command injection attacks.

FIG. 1 illustrates an example of a system 100 for distributed computing (e.g., cloud computing) that supports techniques for detecting command injection attacks in accordance with various aspects of the present disclosure. The system 100 includes client devices 105, applications 110, authentication platform 115, and data storage 120. Authentication platform 115 may be an example of a public or private cloud network. A client device 105 may access authentication platform 115 over network connection 135. The network may implement transmission control protocol and internet protocol (TCP/IP), such as the Internet, or may implement other network protocols. A client device 105 may be an example of a user device, such as a server (e.g., client device 105-a), a smartphone (e.g., client device 105-b), or a laptop (e.g., client device 105-c). In other examples, a client device 105 may be a desktop computer, a tablet, or another computing device or system capable of generating, analyzing, transmitting, or receiving communications. In some examples, a client device 105 may be operated by a user that is part of a business, an enterprise, a non-profit, a startup, or any other organization type.

A client device 105 may interact with multiple applications 110 using one or more interactions 130. The interactions 130 may include digital communications, application programming interface (API) calls, hypertext transfer protocol (HTTP) messages, or any other interaction between a client device 105 and an application 110. Data may be associated with the interactions 130. A client device 105 may access authentication platform 115 to store, manage, and process the data associated with the interactions 130. In some examples, the client device 105 may have an associated security or permission level. A client device 105 may have access to some applications, data, and database information within authentication platform 115 based on the associated security or permission level, and may not have access to others.

Applications 110 may interact with the client device 105 via email, web, text messages, or any other suitable form of interaction. The interaction 130 may be a business-to-business (B2B) interaction or a business-to-consumer (B2C) interaction. An application 110 may also be referred to as a customer, a client, a website, or some other suitable terminology. In some examples, the application 110 may be an example of a server, a node, a computer cluster, or any other type of computing system, component, or environment. In some examples, the application 110 may be operated by a user or a group of users.

Authentication platform 115 may offer cloud-based services to the client devices 105, the applications 110, or both. In some examples, the authentication platform 115 may support a database system such as a multi-tenant database system. In such cases, authentication platform 115 may serve multiple client devices 105 with a single instance of software. However, other types of systems may be implemented, including—but not limited to—client-server systems, mobile device systems, and mobile network systems. Authentication platform 115 may receive data associated with interactions 130 from the client device 105 over network connection 135, and may store and analyze the data. In some examples, authentication platform 115 may receive data directly from an interaction 130 between an application 110 and the client device 105. In some examples, the client device 105 may develop applications to run on authentication platform 115. Authentication platform 115 may be implemented using remote servers. In some examples, the remote servers may be examples of data storage 120.

Data storage 120 may include multiple servers. The multiple servers may be used for data storage, management, and processing. Data storage 120 may receive data from authentication platform 115 via connection 140, or directly from the client device 105 or an interaction 130 between an application 110 and the client device 105. Data storage 120 may utilize multiple redundancies for security purposes. In some examples, the data stored at data storage 120 may be backed up by copies of the data at multiple locations.

Subsystem 125 may include client devices 105, authentication platform 115, and data storage 120. In some examples, data processing may occur at any of the components of subsystem 125, or at a combination of these components. In some examples, servers may perform the data processing. The servers may be a client device 105 or located at data storage 120.

In some examples of the system 100, the subsystem 125 (e.g., a software platform) may experience malicious attacks in which a user (e.g., via a client device 105) may transmit a request (e.g., via an interaction 130) to attempt to gain unauthorized access to data (e.g., identifying information associated with one or more applications 110 that corresponds to one or more other users) stored at the data storage 120. For example, the attacker may obfuscate defense mechanisms at the subsystem 125 by injecting malicious code into the request (e.g., a login request or any other type of request for the subsystem 125 to execute one or more commands). The malicious code (e.g., a command injected into the request) may correspond to a programming language that is different from another programming language associated with the request. For example, the request may be associated with a programming language (e.g., an expected programming language, such as HTTP), while the injected command may correspond to another programming language (e.g., an unexpected programming language, such as SQL, JavaScript, XML, or XXE) unassociated with the request. In some examples, the subsystem 125 may determine that a request includes a command injection (e.g., may identify a command injection attack) if the request includes code that corresponds to an unexpected programming language (or that code included in the request does not correspond to the expected programming language).

Some techniques for detecting command injection attacks may rely on synthetic data. For example, such techniques may use data collected from artificially generated command injection attacks to identify whether a request includes code that corresponds to an unexpected programming language. In some examples, however, such techniques may falsely identify a command injection attack, for example if the code includes language features (e.g., words, combinations of words, delimiters) that are common to multiple programming languages. For example, techniques that rely on synthetic data may identify a combination of words corresponding to an unexpected programming language (e.g., a programming language unassociated with the request) as a command injection attack, irrespective of whether the combination of words also corresponds to the expected programming language (e.g., the programming language associated with the request). Such techniques may therefore lead to one or more inefficiencies associated with detecting command injection attacks.

As described herein, the subsystem 125 (e.g., a software platform associated with a client device 105, or an authentication platform 115, or both) may support techniques for detecting command injection attacks using natural data sets. For example, the subsystem 125 may use programming language models (e.g., language models) developed using data collected from previously detected command injection attacks. In some examples, the subsystem 125 may train multiple language models to identify language features that are representative of the respective programming language and may use the language models to determine whether a request includes the representative language features. In some examples, using representative language features to identify each programming language that may be represented in a request may increase the reliability with which the subsystem 125 may detect a command injection attack.

For example, the subsystem 125 may receive, from a user a request that is associated with a first programming language (e.g., an expected programming language) from a user (e.g., via a client device 105). The subsystem 125 may use a first language model corresponding to the first programming language to determine a first mixture associated with the request. The first mixture may be based on whether the request includes language features representative of the first programming language. For example, the first mixture may be based on (e.g., correspond to) a summation of weights associated with the language features included in the request that are representative of the first programming language.

Additionally, or alternatively, the subsystem 125 may use a second language model corresponding to a second programming language (e.g., an unexpected programming language, a language unassociated with the request) to determine a second mixture associated with the request. The second mixture may be based on whether the request includes language features representative of the second programming language. For example, the second mixture may be based on (e.g., correspond to) a summation of weights associated with the language features included in the request that are representative of the second programming language. The subsystem 125 may execute (e.g., at the data storage 120) or refrain from executing the request based on the first mixture and the second mixture. That is, the subsystem may use the first mixture and the second mixture (e.g., respective distributions of language features corresponding to the first programming language and the second programming language) to determine whether the request corresponds to a command injection attack.

For example, the subsystem 125 may determine whether the first mixture satisfies a first threshold (e.g., a threshold associated with the first programming language). Additionally, or alternatively, the subsystem 125 may determine whether the second mixture satisfies a second threshold (e.g., a threshold associated with the first programming language). The subsystem 125 may execute or refrain from executing the request based on the first mixture satisfying the first threshold or the second mixture satisfying the second threshold, or both. For example, the subsystem 125 may determine that the second mixture satisfies (e.g., exceeds) the second threshold. In such an example, the subsystem 125 may determine that the request includes an unexpected programming language. As such, the subsystem 125 may determine that the request corresponds to a command injection attack and may refrain from executing the request. Additionally, or alternatively, the subsystem 125 may determine that the first mixture fails to satisfy (e.g., fails to exceed) the first threshold. In such an example, the subsystem 125 may determine that the request fails to include the expected programming language. As such, the subsystem 125 may determine that the request corresponds to a command injection attack and may refrain from executing the request.

It should be appreciated by a person skilled in the art that one or more aspects of the disclosure may be implemented in a system 100 to additionally, or alternatively, solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
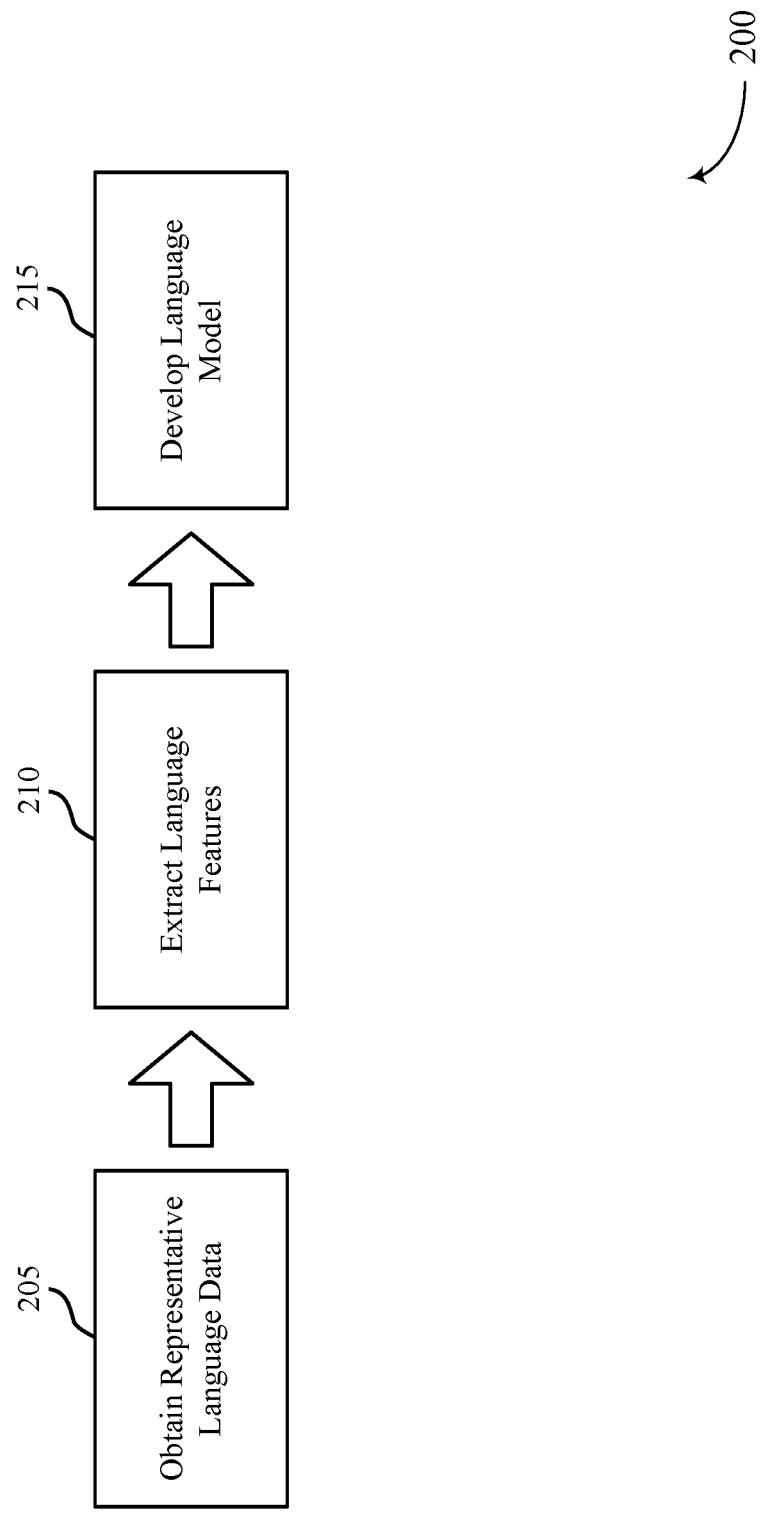
FIG. 2 illustrates an example of a language model development procedure that supports techniques for detecting command injection attacks in accordance with aspects of the present disclosure.

FIG. 2 illustrates an example of a language model development procedure 200 that supports techniques for detecting command injection attacks in accordance with aspects of the present disclosure. In some examples, the language model development procedure 200 may implement or be implemented by aspects of the system 100. For example, the language model development procedure 200 may be implemented at a software platform, which may be an example of subsystem 125 as described with reference to FIG. 1.

In some examples, a user may use the software platform for cyber security. For example, the software platform may detect and address multiple threats against the software platform and applications (e.g., customers) associated with the software platform. In some examples, a threat against the software platform may include a command injection attack. In some instances, successful command injection attacks from a user (e.g., an attacker) may enable the attacker to gain unauthorized access to resources (e.g., identifying information corresponding to other users) associated with the software platform or the applications, or both. As such, successful command injection attacks may lead to loss of revenue, reputational damage (e.g., for the software platform or the applications), or data loss, among other possible examples.

In some examples, command injection attacks may be visible to the software platform. For example, command injection attacks may be detectable (e.g., by the software platform) via analysis of request data (e.g., HTTP request data). However, some tools for detecting command injection attacks may be susceptible to false positives and provide insufficient cyber security for users. For example, some tools for detecting command injection attacks may be constrained to particular programming languages, such as SQL. Additionally, or alternatively, some tools may use detection models that are trained using synthetic data (e.g., data collected from artificially generated command injection attacks). In some examples, such tools may rely on libraries that are common to multiple detection capabilities (e.g., web application firewalls (WAF) and intrusion detection systems (IDS)). For example, such libraries may be ported into a multiple programming languages and used in open source security software. In some examples, however, tools that rely libraries may also rely on keywords (e.g., included in the libraries) for rules to detect SQL injection attacks (e.g., filters to detect SQL injection) and may be susceptible to false positives (e.g., with code that includes normal text).

Various aspects of the present disclosure may reduce false positives and provide one or more efficiencies for the detection of command injection attacks. For example, techniques for detecting command injection attacks, as described herein, may provide a model for detecting a relatively wide range of attack classes (e.g., may not be constrained to SQL injection attacks). For example, some techniques for detecting command injection attacks, as described herein, may enable the software platform to detect a class of command injection attacks that may include any attacks in which an adversary (e.g., an attacker) attempting to execute a command injects items (e.g., malicious code) into an existing command (e.g., request) thus modifying interpretation away from what was intended (e.g., by the existing command). Such commands (e.g., parent commands) may include strings (e.g., standalone strings) that may be interpreted by a downstream component and cause one or more responses. In some examples, attacks that use such commands may be possible, for example if untrusted values are used to build the command strings. In some examples, a weaknesses in input validation or command construction may enable command injection attacks and lead to successful exploitation. In some examples, to increase the reliability with which command injection attacks may be detected, techniques for detecting command injection attacks, as described herein, may utilize language models developed using natural data sets (e.g., data collected from previously detected command injection attacks).

At 205, the software platform may obtain representative language data (e.g., data representative of one or more programming languages) from previously detected command injection attacks. For example, the software platform may collect representative language data via a network-attached system that may act as a decoy to lure cyber attackers (e.g., into attempting command injection attacks). In such an example, the command injection attacks may be detected (e.g., at the software platform), deflected, and analyzed to collect representative language data (e.g., data that is representative of a particular programming language). For example, the software platform may use the detected command injection attacks to obtain representative language data that may be associated with attempts to gain unauthorized access to information stored in the network-attacked system. Additionally, or alternatively, the software platform may collect representative language data from code repositories (e.g., files of code that may be representative of a programming language). In some examples, the software platform may use the detected command injection attacks or code repositories (or both) to collect multiple sets of representative language data for multiple programming languages.

In some examples, the software platform may use an obtained set of representative language date to build a language model. Additionally, or alternatively, the software platform may use multiple sets of representative data to build representative language models for multiple language (e.g., any language associated with a representative data set). In some examples, the software platform may build a language model using language features that are representative of the language. For example, at 210, the software platform may extract language features from the obtained set of representative language data (e.g., a representative data set). As described herein, language features may include keywords, operators (e.g., common operators that may be used to perform a query of the respective language), or delimiters (e.g., separators, how keywords may be separated into different logical groups within a query), or any combination thereof.

At 215, the software platform may develop one or more language models using the extracted language features. In some examples, the software platform may use machine learning to develop a language model using language features extracted from a representative data set. In some examples, the extracted language features may be referred to as programming tokens or tokens. For example, a token may include a keyword (e.g., select, from, table), an operator (e.g., *, +, <, >), or a delimiter (e.g., [ ], ( ), { }), or any combination thereof. The software platform may use one or more machine learning techniques (e.g., a family of machine learning techniques), such as topic modeling techniques, to develop a language model using tokens. Some topic modeling techniques, such as latent Dirichlet allocation (LDA), may include a statical process that associates a topic (e.g., word, phrase, token) with a document (e.g., a representative data set) based on a quantity of occurrences of the token within the representative data set. In some examples, however, an attacker may obfuscate command injection techniques that utilize such language models (e.g., language models based on LDA), for example by injecting commands (e.g., queries, malicious code) that are relatively short compared to the request (e.g., the existing request). In such an example, a quantity of occurrences of tokens associated with an unexpected programming language (e.g., a programming language corresponding to the injected command but unassociated with the request) may be relatively small compared to another quantity of tokens associated with an expected programming language (e.g., a programming language associated with the request). As such, the software platform may determine that the request unassociated with the unexpected language and execute the command.

In some other examples, the software platform may use topic modeling techniques (e.g., probabilistic approaches) that consider a frequency at which a topic (e.g., word, phrase, token) may occur within the representative data set. For example, the software platform may determine a frequency at which tokens occur throughout the representative data set. That is, the software platform may determine how representative each token may be of the respective language.

For example, a token that occurs throughout the representative data set at a relatively high frequency may be more representative of the respective language (e.g., and associated with a relatively high weight) compared to another token that may occur throughout the representative data set at a relatively low frequency (e.g., and may be associated with a relatively low weight).

In some examples, the software platform may determine (e.g., calculate) a weight for each token (e.g., of a set of tokens identified for a programming language) that may correspond to the frequency (e.g., periodicity) of the token throughout the representative data set (e.g., a data set representative of the programming language). The software platform may build a language model for the programming language using the set of identified tokens and the corresponding weights. In some examples, the software platform may use one or multiple language models (e.g., each language model corresponding to a respective programming language) to calculate a respective score (e.g., mixture) for each programming language (e.g., the programming language associated with the request and one or more other threat languages). In such an example, the software platform may use a mixture set (e.g., a vector score include the respective scores for each programming language) to determine whether the request is innocuous or malicious (e.g., suspicious or belligerent). For example, the software platform may determine whether the request is innocuous or malicious based on multiple thresholds and the multiple language scores. In some examples, building language models based on representative tokens of languages (e.g., computer languages) may increase a reliability which the software platform may identify command injection attacks, among other possible benefits.

Figure 3:
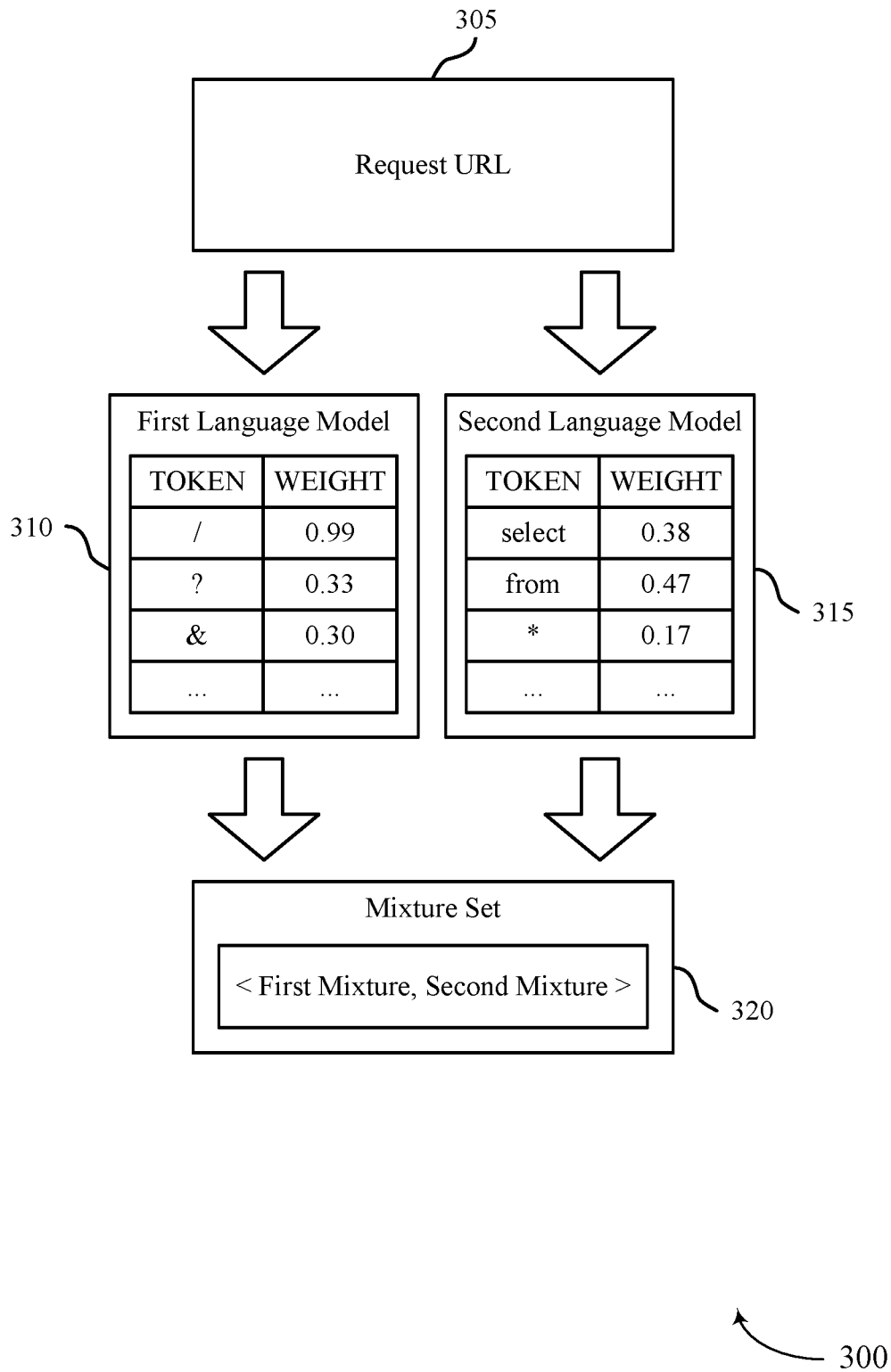
FIG. 3 illustrates an example of a command injection detection procedure that supports techniques for detecting command injection attacks in accordance with aspects of the present disclosure.

FIG. 3 illustrates an example of a command injection detection procedure 300 that supports techniques for detecting command injection attacks in accordance with aspects of the present disclosure. In some examples, the command injection detection procedure 300 may implement or be implemented by aspects of the system 100 and the language model development procedure 200. For example, the command injection detection procedure 300 may be implemented at a software platform, which may be an example of subsystem 125 as described with reference to FIG. 1 and a software platform as described with reference to FIG. 2. Additionally, or alternatively, the command injection detection procedure 300 may use one or more language models (e.g., a first language model 310 and a second language model 315) which may be examples of language models developed in accordance with the language model development procedure 200, as described with reference to FIG. 2.

In some examples, the software platform may support one or more techniques for detecting command injection attacks, as described herein. For example, the software platform may support the first language model 310 and the second language model 315. The first language model 310 may correspond to a first programming language. For example, the first language model 310 may include a first set of tokens (e.g., /, ?, &) that are representative of the first programming language. Additionally, or alternatively, the second language model 315 may correspond to a second programming language. For example, the second language model 315 may include a second set of tokens (e.g., select, from, *) that are representative of the second programming language. Each token of the first set of tokens and the second set of tokens may be associated with a weight that may be determined (e.g., at the software platform) based on respective set of representative language data. That is, the first language model 310 may include a first set of weights (e.g., corresponding to the first set of tokens) that may be based on a set of data representative of the first programming language. Additionally, or alternatively, the second language model 315 may include a second set of weights (e.g., corresponding to the second set of tokens) that may be based on a set of data representative of the second programming language.

In some examples, the software platform may receive a request (e.g., a login request) that may include request uniform resource locators (URL), such as a request URL 305. The software platform may use the first language model and the second language model (e.g., two dictionaries) to determine (e.g., calculate) a set of one or more mixtures (e.g., a mixture set 320) for the request URL 305. For example, the software platform may use the first language model 310 to determine a first mixture and the second language model 315 to determine a second mixture. In some examples, the first mixture may correspond to a summation of the first set of weights associated with the first set of tokens (e.g., included in the first language model 310) and the second mixture may correspond to a summation of the second set of weights associated with the second set of tokens (e.g., included in the second language model 315). That is, for each occurrence of a token within the request URL 305, the software platform may add the corresponding weight of the token to the respective mixture. For example, for each occurrence of a token included in the first language model 310, the software platform may add the corresponding weight to the first mixture. As an illustrative example, for each occurrence of the token "I" within the request URL 305, the software platform may add 0.99 to the first mixture. Additionally, or alternatively, for each occurrence of a token included in the second language model 315, the software platform may add the corresponding weight to the second mixture. For example, for each occurrence of the token "select" within the request URL 305, the software platform may add 0.38 to the second mixture. In some examples, the software platform may use the first mixture to determine a distribution of the first programming language within the request URL 305 (e.g., a likeness between the first programming language and the request URL 305). Additionally, or alternatively, the software platform may use the second mixture to determine a distribution of the second programming language within the request URL 305 (e.g., a likeness between the second programming language and the request URL 305).

In some examples, software platform may compare the first mixture to the second mixture to determine whether the request URL 305 includes a command injection. For example, the request URL 305 may be associated with the first programming language and unassociated with the second programming language. In such an example, the software platform may use the first mixture or the second mixture (or both) to determine whether the request URL 305 includes an injection (e.g., malicious code) of the second programming language. For example, in an attempt to obfuscate an injection of the second programming language, the request URL 305 (e.g., a command) may include some tokens (e.g., normal markers) of the first programming language and some tokens of the second programming language. As such, the software platform may use a comparison between the first mixture and the second mixture to determine whether the request URL 305 includes an injection of the second programming language (or one or more other unexpected programming languages). Although the example of FIG. 3 illustrates the command injection detection procedure 300 using two language models, it is to be understood that the command injection detection procedure 300 may include one or multiple (e.g., two or more than two) language models and the examples described herein should not be considered limiting to the scope covered by the claims or the disclosure. For example, the mixture set 320 may include one or multiple mixtures and the command injection detection procedure 300 may be used to detected command injections for one or multiple (e.g., different) programming languages. For example, the command injection detection procedure 300 may be used to detect SQL injections, HTTP injections, JavaScript injections, XML injections, and XXE injections, among other examples.

In some examples, the software platform may compare one or both of the first mixture and the second mixture to a threshold. For example, the software platform may compare the first mixture to a first threshold (e.g., associated with the first programming language) and the second mixture to a second threshold (e.g., associated with the second programming language). In some examples, the first threshold and the second threshold may be determined (e.g., dynamically) at the software platform based on a composition of the mixture set 320. That is, the first threshold and the second threshold may each be determined based on the mixtures (e.g., the programming languages associated with the mixtures) included in the mixture set 320. For example, the first threshold and the second threshold may be determined at the software platform based on an interaction (e.g., a zone of interactions) between the first programming language and the second programming language. In some examples, such interactions may be determined at the software platform based on the respective sets of representative language data. For example, the software platform may use the sets of representative language data (e.g., for the first programming language and the second programming language) to identify a non-linear relationship association between the first mixture and the second mixtures. In such an example, the software platform may determine the first threshold and the second threshold based on the determined non-linear association between the first mixture and the second mixture. In some examples, determining (e.g., selecting) respective thresholds for the first mixture and the second mixture based on the determined non-linear associated may increase a reliability which the software platform may identify command injection attacks, among other possible benefits.

Figure 4:
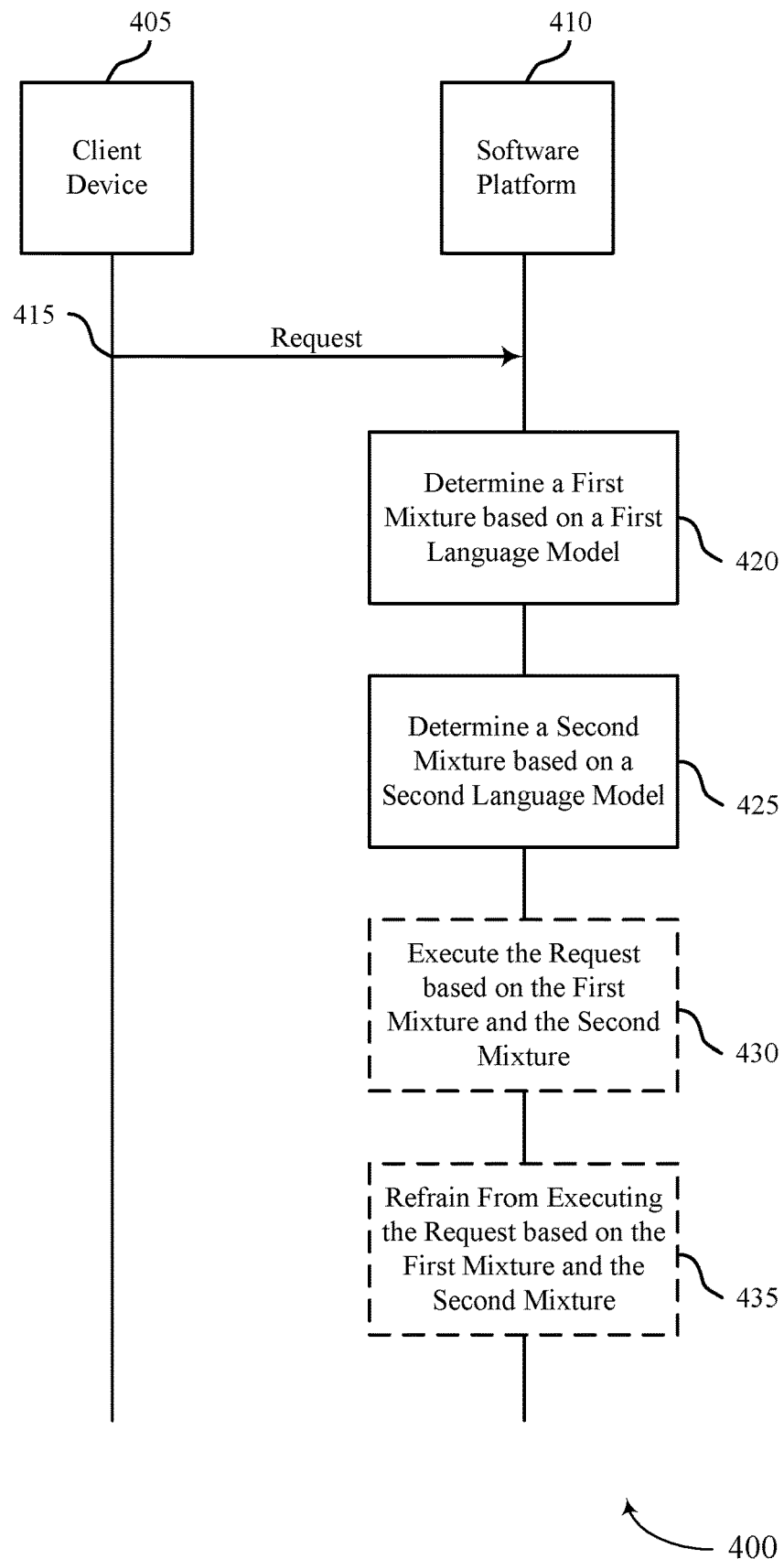
FIG. 4 illustrates an example of a process flow that supports techniques for detecting command injection attacks in accordance with aspects of the present disclosure.

FIG. 4 illustrates an example of a process flow 400 that supports techniques for detecting command injection attacks in accordance with aspects of the present disclosure. In some examples, the process flow 400 may implement or be implemented at aspects of the system 100, the language model development procedure 200, and the command injection detection procedure 300. For example, the process flow 400 may be implemented at a client device 405 or a software platform 410, or both, which may be an example of the corresponding devices as described with reference to FIGS. 1 through 3. In the following description of the process flow 400, the information communicated between the client device 405 and the software platform 410 may be performed in different orders or at different times than shown. Additionally, or alternatively, some operations may be omitted from the process flow 400 and other operations may be added to the process flow 400. The process flow 400 may provide for improved management of requests (e.g., login requests) at the software platform 410, among other possible benefits.

At 415, the software platform 410 may receive (e.g., from a user via the client device 405) a request associated with a first programming language. The request may be an example of a request described throughout the present disclosure, including with reference to FIG. 3. For example, the request may include a request URL. Additionally, or alternatively, in some examples, the request may be a login request.

At 420, the software platform 410 may determine a first mixture associated with the request. The first mixture may be an example of a first mixture described throughout the present disclosure, including with reference to FIG. 3. For example, the first mixture may be based on a first language model corresponding to the first programming language.

At 425, the software platform 410 may determine a second mixture associated with the request. The second mixture may be an example of a second mixture described throughout the present disclosure, including with reference to FIG. 3. For example, the second mixture may be based on a second language model corresponding to a second programming language. In some examples, the second programming language may be different from the first programming language.

The first language model and the second language model may each be an example of a language model described throughout the present disclosure, including with reference to FIG. 2. For example, the software platform 410 may develop the first language model and the second language model using natural data sets. In some examples, the software platform 410 may develop the first language model and the second language model using topic modeling and respective sets of representative data. For example, the software platform 410 may perform a training operation using a machine learning model (e.g., a topic model), a set of data representative of the first programming language, and another set of data representative of the second programming language. In such an example, the first language model and the second language model may be based on the training operation.

In some examples, the first language model may include programming tokens, and corresponding weights, representative of the first programming language. Additionally, or alternatively, the second language model may include programming tokens, and corresponding weights, representative of the second programming language. As such, in some examples, the software platform 410 may determine the first mixture (e.g., at 420) based on whether the request includes one or more programming tokens included in the first language model. Additionally, or alternatively, the software platform 410 may determine the second mixture (e.g., at 425) based on whether the request includes one or more programming tokens included in the second language model.

In some examples, the software platform 410 may execute or refrain from executing the request based on the first mixture and the second mixture. For example, the software platform 410 may determine to execute or refrain from executing the request based on whether the first threshold satisfies a first threshold or the second mixture satisfies a second threshold (or both). The first threshold and the second threshold may be examples of a threshold described throughout the present disclosure, including with reference to FIG. 3. For example, the software platform 410 may determine the first threshold and the second threshold based on a non-linear association between the first mixture and the second mixture.

In some examples, at 430, the software platform 410 may execute the request based on the first mixture and the second mixture. For example, the software platform 410 may execute the request based on determining that the first mixture satisfies the first threshold or that the second mixture fails to satisfy the second threshold (or both).

In some other examples, at 435, the software platform 410 may refrain from executing the request based on the first mixture and the second mixture. For example, the software platform 410 may refrain from executing the request based on determining that the first mixture fails to satisfy the first threshold or that the second mixture satisfies the second threshold (or both). In some examples, determining to execute a request based on whether one or more mixtures associated with the request satisfy respective thresholds may enable the software platform 410 to reduce command injection attacks and prevent data loss, among other possible benefits.

Figure 5:
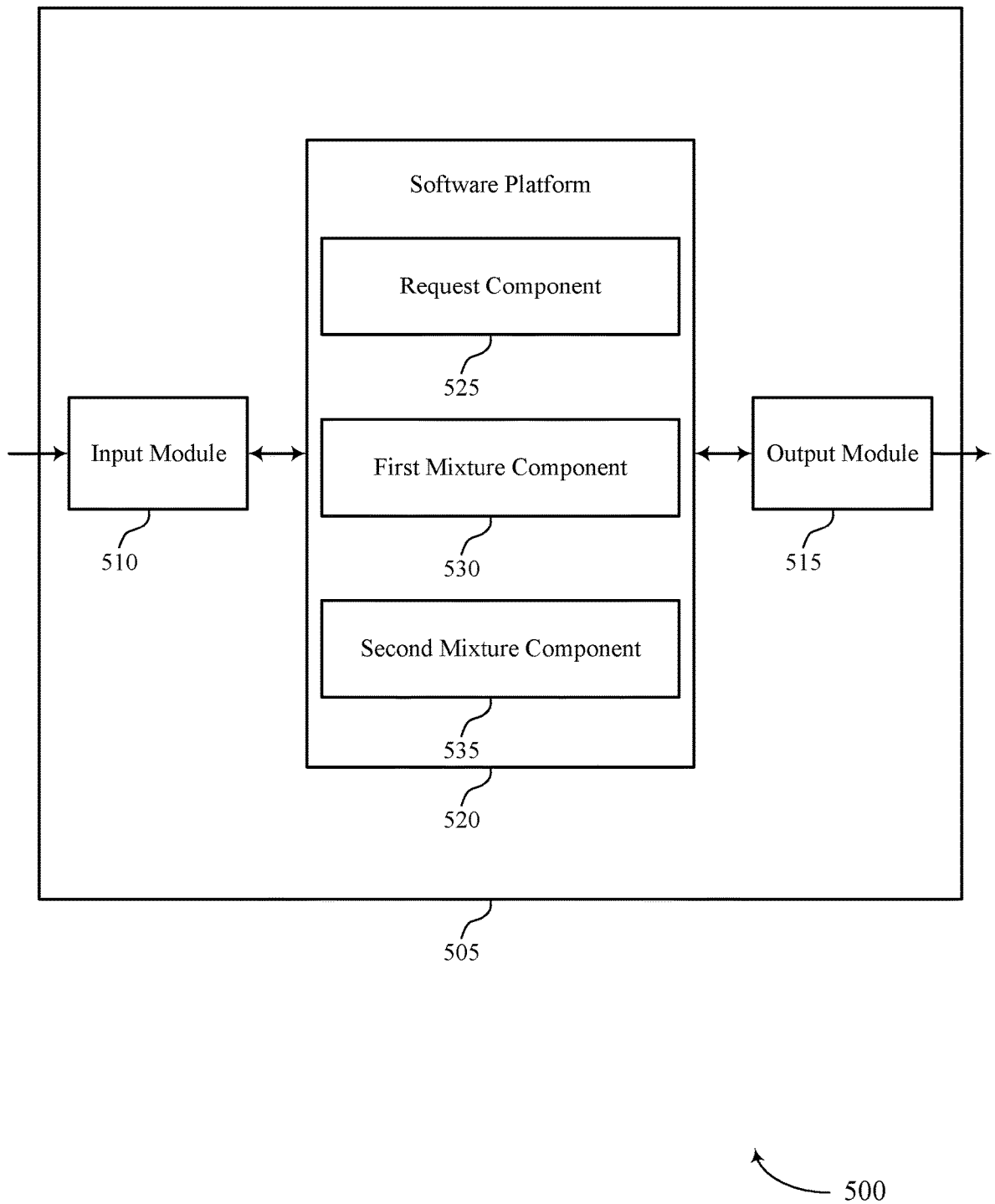
FIG. 5 shows a block diagram of an apparatus that supports techniques for detecting command injection attacks in accordance with aspects of the present disclosure.

FIG. 5 shows a block diagram 500 of a device 505 that supports techniques for detecting command injection attacks in accordance with aspects of the present disclosure. The device 505 may include an input module 510, an output module 515, and a software platform 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the software platform 520 to support techniques for detecting command injection attacks. In some cases, the input module 510 may be a component of an I/O controller 710 as described with reference to FIG. 7.

The output module 515 may manage output signals for the device 505. For example, the output module 515 may receive signals from other components of the device 505, such as the software platform 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the software platform 520 may include a request component 525, a first mixture component 530, a second mixture component 535, or any combination thereof. In some examples, the software platform 520, or various components thereof, may be configured to perform various operations (e.g., receiving, monitoring, transmitting) using or otherwise in cooperation with the input module 510, the output module 515, or both. For example, the software platform 520 may receive information from the input module 510, send information to the output module 515, or be integrated in combination with the input module 510, the output module 515, or both to receive information, transmit information, or perform various other operations as described herein.

The software platform 520 may support managing requests at a device (e.g., the device 505) in accordance with examples as disclosed herein. The request component 525 may be configured as or otherwise support a means for receiving, at a software platform of the device, a request associated with a first programming language. The first mixture component 530 may be configured as or otherwise support a means for determining a first mixture associated with the request, where the first mixture is based on a first language model corresponding to the first programming language. The second mixture component 535 may be configured as or otherwise support a means for determining a second mixture associated with the request, where the second mixture is based on a second language model corresponding to a second programming language different from the first programming language. The request component 525 may be configured as or otherwise support a means for executing or refraining from executing the request based on the first mixture and the second mixture.

Figure 6:
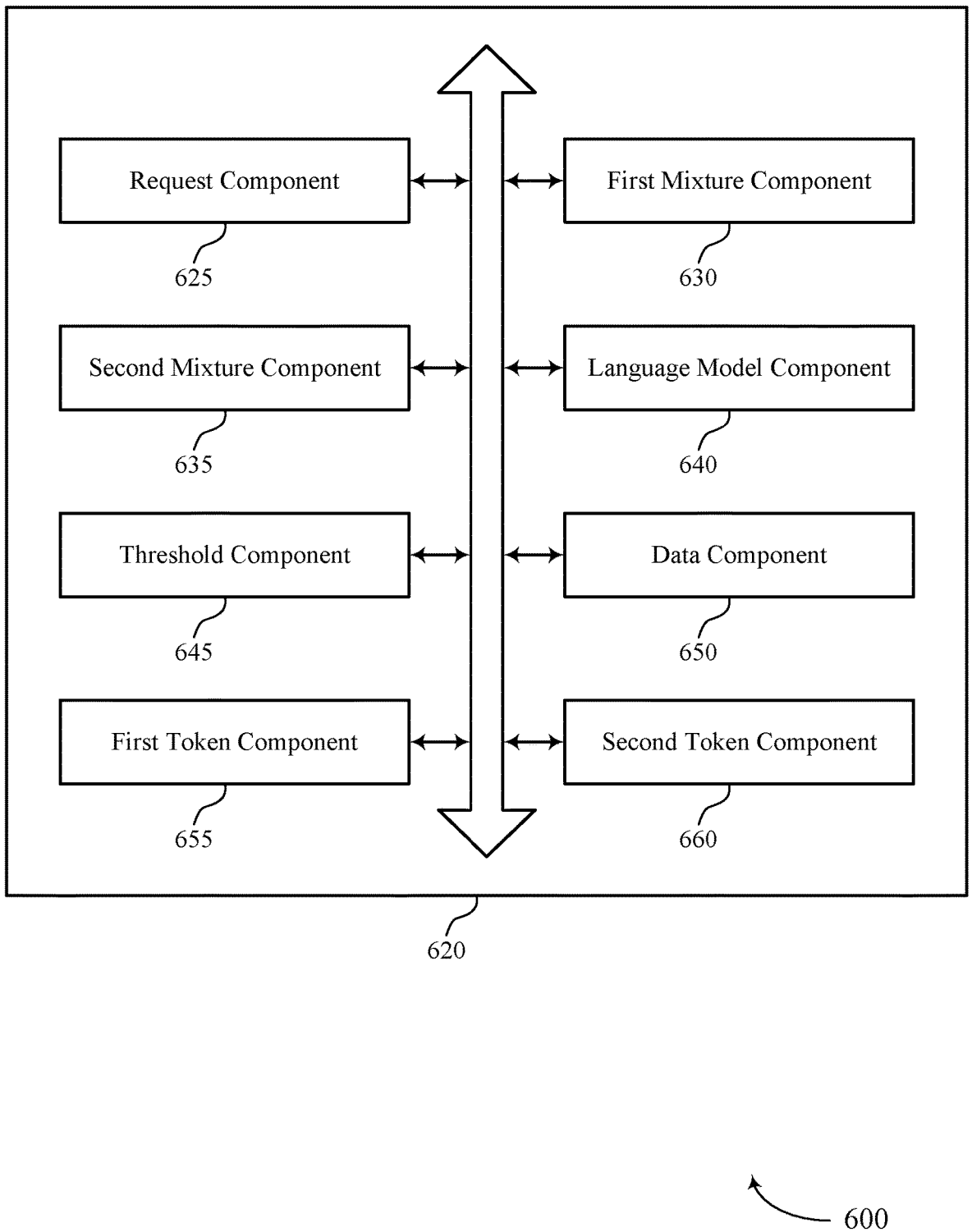
FIG. 6 shows a block diagram of a software platform that supports techniques for detecting command injection attacks in accordance with aspects of the present disclosure.

FIG. 6 shows a block diagram 600 of a software platform 620 that supports techniques for detecting command injection attacks in accordance with aspects of the present disclosure. The software platform 620 may be an example of aspects of a software platform or a software platform 520, or both, as described herein. The software platform 620, or various components thereof, may be an example of means for performing various aspects of techniques for detecting command injection attacks as described herein. For example, the software platform 620 may include a request component 625, a first mixture component 630, a second mixture component 635, a language model component 640, a threshold component 645, a data component 650, a first token component 655, a second token component 660, or any combination thereof. Each of these components may communicate, directly or indirectly, with one another (e.g., via one or more buses).

The software platform 620 may support managing requests at a device in accordance with examples as disclosed herein. The request component 625 may be configured as or otherwise support a means for receiving, at a software platform of the device, a request associated with a first programming language. The first mixture component 630 may be configured as or otherwise support a means for determining a first mixture associated with the request, where the first mixture is based on a first language model corresponding to the first programming language. The second mixture component 635 may be configured as or otherwise support a means for determining a second mixture associated with the request, where the second mixture is based on a second language model corresponding to a second programming language different from the first programming language. In some examples, the request component 625 may be configured as or otherwise support a means for executing or refraining from executing the request based on the first mixture and the second mixture.

In some examples, the language model component 640 may be configured as or otherwise support a means for determining, based on the first language model and the second language model, whether the request includes a respective one or more programming tokens corresponding to the first programming language or the second programming language, or both, where determining the first mixture and the second mixture is based on whether the request includes the respective one or more programming tokens.

In some examples, to support determining whether the request includes the respective one or more programming tokens, the first token component 655 may be configured as or otherwise support a means for determining, based on the first language model, that the request includes a first programming token corresponding to the first programming language, where the first mixture is based on a first weight associated with the first programming token. In some examples, to support determining whether the request includes the respective one or more programming tokens, the second token component 660 may be configured as or otherwise support a means for determining, based on the second language model, that the request includes a second programming token corresponding to the second programming language, where the second mixture is based on a second weight associated with the second programming token.

In some examples, to support executing or refraining from executing the request, the threshold component 645 may be configured as or otherwise support a means for determining whether the first mixture satisfies a first threshold. In some examples, to support executing or refraining from executing the request, the threshold component 645 may be configured as or otherwise support a means for determining whether the second mixture satisfies a second threshold. In some examples, to support executing or refraining from executing the request, the request component 625 may be configured as or otherwise support a means for executing or refraining from executing the request is based on the first mixture satisfying the first threshold or the second mixture satisfying the second threshold, or both.

In some examples, the threshold component 645 may be configured as or otherwise support a means for determining the first threshold and the second threshold based on non-linear association between the first mixture and the second mixture. In some examples, the language model component 640 may be configured as or otherwise support a means for performing, at the software platform of the device, a training operation using a machine learning model, where the first language model and the second language model are based on the training operation. In some examples, the machine learning model includes a topic model.

In some examples, the data component 650 may be configured as or otherwise support a means for obtaining a first set of data associated with the first programming language and a second set of data associated with the second programming language. In some examples, the language model component 640 may be configured as or otherwise support a means for identifying a first set of programming tokens based on the first set of data and a second set of programming tokens based on the second set of data, where the first language model includes the first set of programming tokens and the second language model includes the second set of programming tokens.

In some examples, the first token component 655 may be configured as or otherwise support a means for assigning a respective weight to each token of the first set of programming tokens based on a respective frequency at which each token of the first set of programming tokens occurs within the first set of data. In some examples, the second token component 660 may be configured as or otherwise support a means for assigning a respective weight to each programming token of the second set of programming tokens based on a respective frequency at which each programming token of the second set of programming tokens occurs within the second set of data. In some examples, each programming token of the first set of programming tokens and the second set of programming tokens includes a keyword, an operator, or a delimiter.

Figure 7:
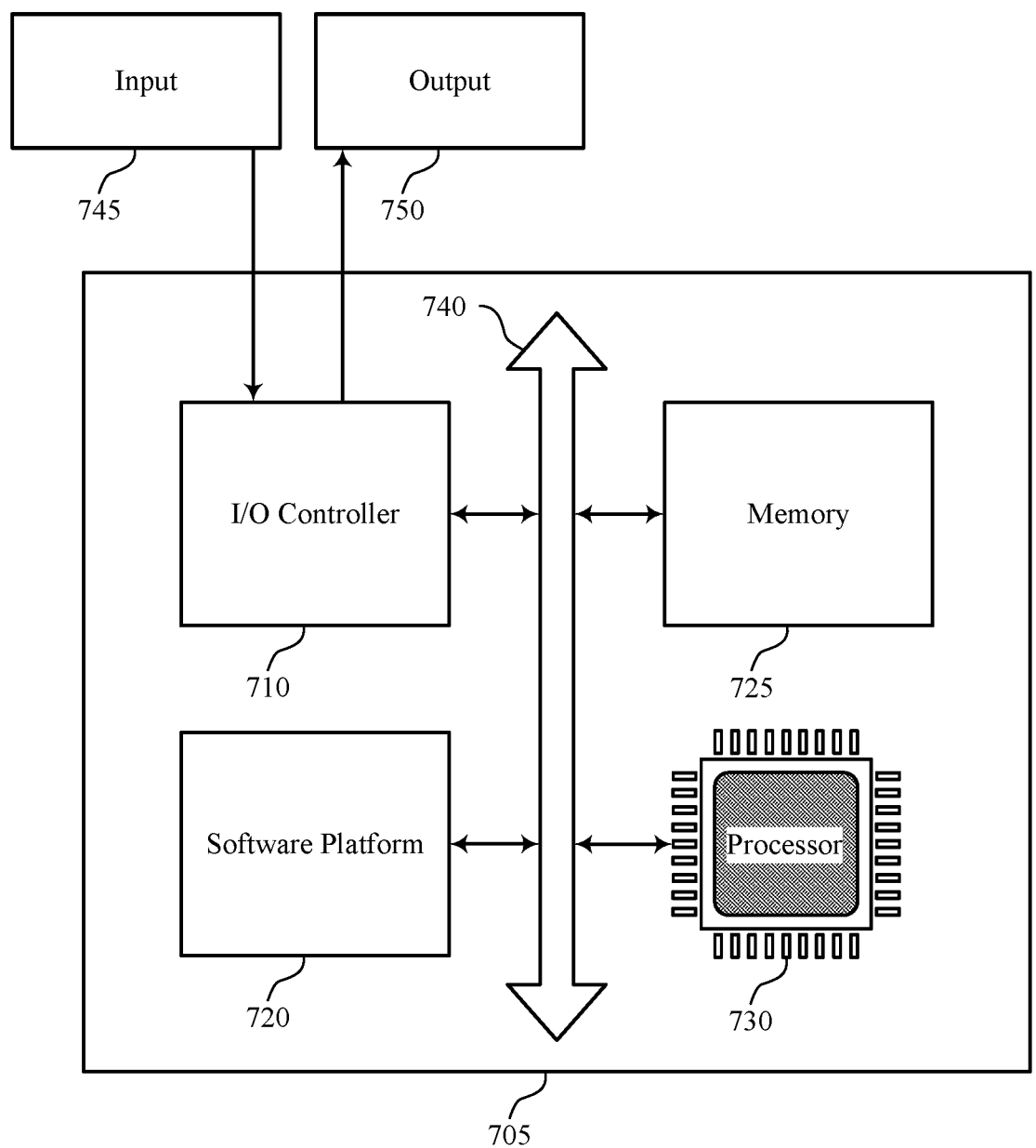
FIG. 7 shows a diagram of a system including a device that supports techniques for detecting command injection attacks in accordance with aspects of the present disclosure.

FIG. 7 shows a diagram of a system 700 including a device 705 that supports techniques for detecting command injection attacks in accordance with aspects of the present disclosure. The device 705 may be an example of or include the components of a device 505 as described herein. The device 705 may include components for bi-directional data communications including components for transmitting and receiving communications, such as a software platform 720, an I/O controller 710, a memory 725, and a processor 730. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

Memory 725 may include random-access memory (RAM) and ROM. The memory 725 may store computer-readable, computer-executable software including instructions that, when executed, cause the processor 730 to perform various functions described herein. In some cases, the memory 725 may contain, among other things, a BIOS which may control basic hardware or software operation such as the interaction with peripheral components or devices.

The processor 730 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting techniques for detecting command injection attacks).

The software platform 720 may support managing requests at a device in accordance with examples as disclosed herein. For example, the software platform 720 may be configured as or otherwise support a means for receiving, at a software platform of the device, a request associated with a first programming language. The software platform 720 may be configured as or otherwise support a means for determining a first mixture associated with the request, where the first mixture is based on a first language model corresponding to the first programming language. The software platform 720 may be configured as or otherwise support a means for determining a second mixture associated with the request, where the second mixture is based on a second language model corresponding to a second programming language different from the first programming language. The software platform 720 may be configured as or otherwise support a means for executing or refraining from executing the request based on the first mixture and the second mixture.

By including or configuring the software platform 720 in accordance with examples as described herein, the device 705 may support techniques for improved utilization of processing capability.

Figure 8:
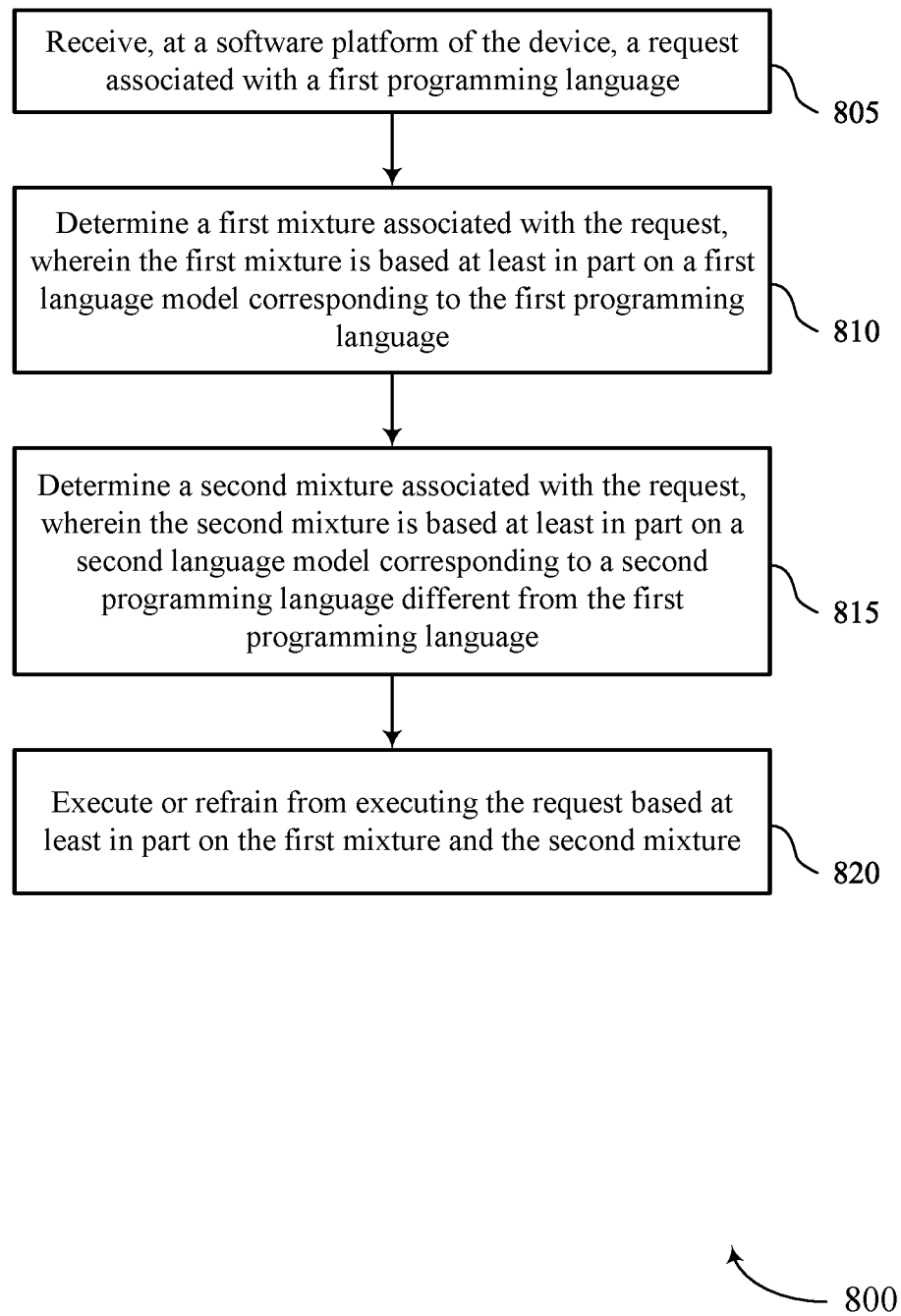
FIGS. 8 and 9 show flowcharts illustrating methods that support techniques for detecting command injection attacks in accordance with aspects of the present disclosure.

FIG. 8 shows a flowchart illustrating a method 800 that supports techniques for detecting command injection attacks in accordance with aspects of the present disclosure. The operations of the method 800 may be implemented by a device or its components as described herein. For example, the operations of the method 800 may be performed by a device as described with reference to FIGS. 1 through 7. In some examples, a device may execute a set of instructions to control the functional elements of the device to perform the described functions. Additionally, or alternatively, the device may perform aspects of the described functions using special-purpose hardware.

At 805, the method may include receiving, at a software platform of the device, a request associated with a first programming language. The operations of 805 may be performed in accordance with examples as disclosed herein. In some examples, aspects of the operations of 805 may be performed by a request component 625 as described with reference to FIG. 6.

At 810, the method may include determining a first mixture associated with the request, where the first mixture is based on a first language model corresponding to the first programming language. The operations of 810 may be performed in accordance with examples as disclosed herein. In some examples, aspects of the operations of 810 may be performed by a first mixture component 630 as described with reference to FIG. 6.

At 815, the method may include determining a second mixture associated with the request, where the second mixture is based on a second language model corresponding to a second programming language different from the first programming language. The operations of 815 may be performed in accordance with examples as disclosed herein. In some examples, aspects of the operations of 815 may be performed by a second mixture component 635 as described with reference to FIG. 6.

At 820, the method may include executing or refraining from executing the request based on the first mixture and the second mixture. The operations of 820 may be performed in accordance with examples as disclosed herein. In some examples, aspects of the operations of 820 may be performed by a request component 625 as described with reference to FIG. 6.

Figure 9:
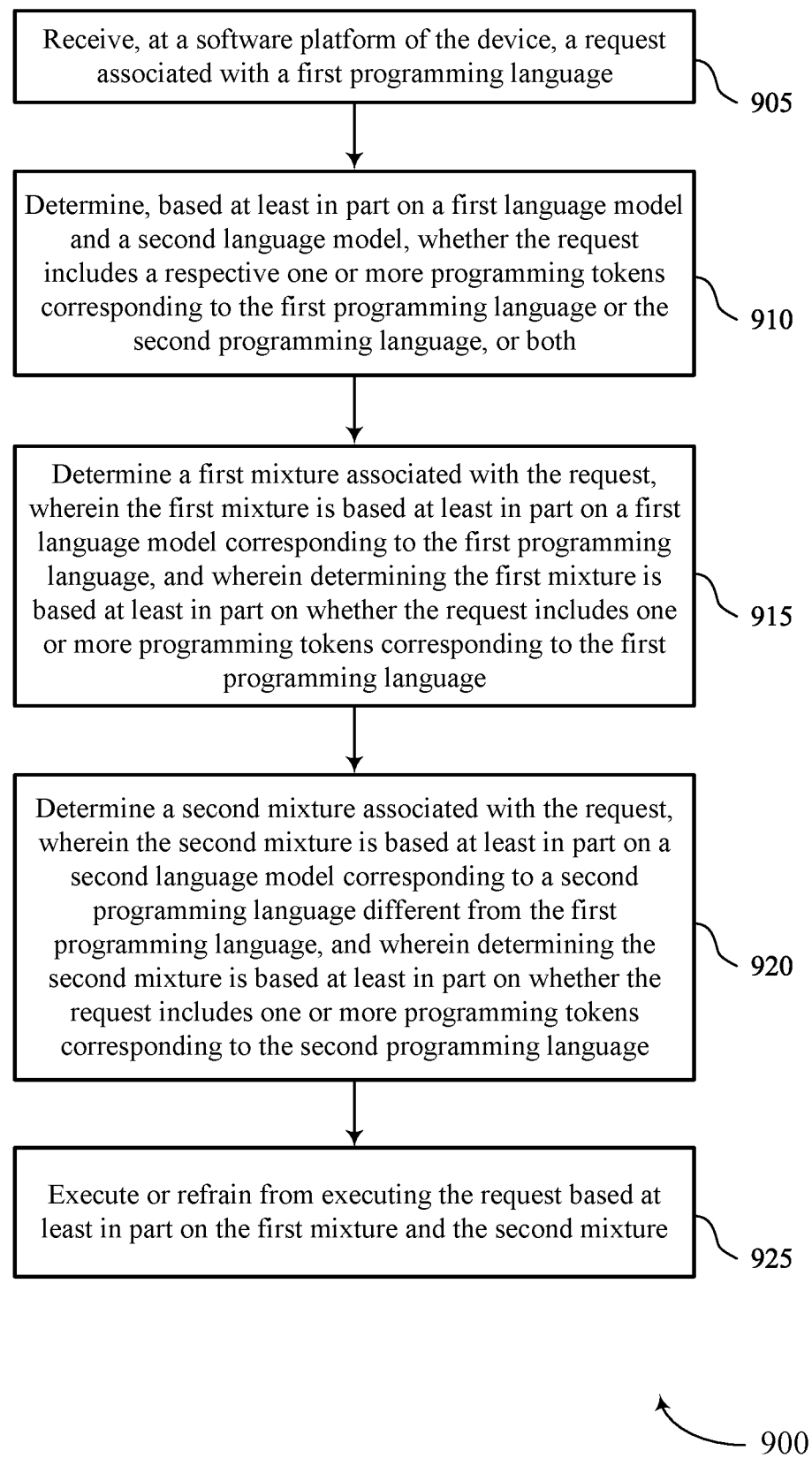

FIG. 9 shows a flowchart illustrating a method 900 that supports techniques for detecting command injection attacks in accordance with aspects of the present disclosure. The operations of the method 900 may be implemented by a device or its components as described herein. For example, the operations of the method 900 may be performed by a device as described with reference to FIGS. 1 through 7. In some examples, a device may execute a set of instructions to control the functional elements of the device to perform the described functions. Additionally, or alternatively, the device may perform aspects of the described functions using special-purpose hardware.

At 905, the method may include receiving, at a software platform of the device, a request associated with a first programming language. The operations of 905 may be performed in accordance with examples as disclosed herein. In some examples, aspects of the operations of 905 may be performed by a request component 625 as described with reference to FIG. 6.

At 910, the method may include determining, based on a first language model and a second language model, whether the request includes a respective one or more programming tokens corresponding to the first programming language or a second programming language, or both. The operations of 910 may be performed in accordance with examples as disclosed herein. In some examples, aspects of the operations of 910 may be performed by a language model component 640 as described with reference to FIG. 6.

At 915, the method may include determining a first mixture associated with the request, where the first mixture is based on a first language model corresponding to the first programming language, and where determining the first mixture is based on whether the request includes one or more programming tokens corresponding to the first programming language. The operations of 915 may be performed in accordance with examples as disclosed herein. In some examples, aspects of the operations of 915 may be performed by a first mixture component 630 as described with reference to FIG. 6.

At 920, the method may include determining a second mixture associated with the request, where the second mixture is based on a second language model corresponding to a second programming language different from the first programming language, and where determining the second mixture is based on whether the request includes one or more programming tokens corresponding to the second programming language. The operations of 920 may be performed in accordance with examples as disclosed herein. In some examples, aspects of the operations of 920 may be performed by a second mixture component 635 as described with reference to FIG. 6.

At 925, the method may include executing or refraining from executing the request based on the first mixture and the second mixture. The operations of 925 may be performed in accordance with examples as disclosed herein. In some examples, aspects of the operations of 925 may be performed by a request component 625 as described with reference to FIG. 6.

1. A method for managing requests at a device is described. The method may include receiving, at a software platform of the device, a request associated with a first programming language, determining a first mixture associated with the request, where the first mixture is based on a first language model corresponding to the first programming language, determining a second mixture associated with the request, where the second mixture is based on a second language model corresponding to a second programming language different from the first programming language, and executing or refraining from executing the request based on the first mixture and the second mixture.

2. An apparatus for managing requests at a device is described. The apparatus may include a processor, memory coupled with the processor, and instructions stored in the memory. The instructions may be executable by the processor to cause the apparatus to receive, at a software platform of the device, a request associated with a first programming language, determine a first mixture associated with the request, where the first mixture is based on a first language model corresponding to the first programming language, determine a second mixture associated with the request, where the second mixture is based on a second language model corresponding to a second programming language different from the first programming language, and execute or refrain from executing the request based on the first mixture and the second mixture.

3. Another apparatus for managing requests at a device is described. The apparatus may include means for receiving, at a software platform of the device, a request associated with a first programming language, means for determining a first mixture associated with the request, where the first mixture is based on a first language model corresponding to the first programming language, means for determining a second mixture associated with the request, where the second mixture is based on a second language model corresponding to a second programming language different from the first programming language, and means for executing or refraining from executing the request based on the first mixture and the second mixture.

4. A non-transitory computer-readable medium storing code for managing requests at a device is described. The code may include instructions executable by a processor to receive, at a software platform of the device, a request associated with a first programming language, determine a first mixture associated with the request, where the first mixture is based on a first language model corresponding to the first programming language, determine a second mixture associated with the request, where the second mixture is based on a second language model corresponding to a second programming language different from the first programming language, and execute or refrain from executing the request based on the first mixture and the second mixture.

5. Some examples of the method, apparatuses, and non-transitory computer-readable medium described herein may further include operations, features, means, or instructions for determining, based on the first language model and the second language model, whether the request includes a respective one or more programming tokens corresponding to the first programming language or the second programming language, or both, where determining the first mixture and the second mixture may be based on whether the request includes the respective one or more programming tokens.

6. In some examples of the method, apparatuses, and non-transitory computer-readable medium described herein, determining whether the request includes the respective one or more programming tokens may include operations, features, means, or instructions for determining, based on the first language model, that the request includes a first programming token corresponding to the first programming language, where the first mixture may be based on a first weight associated with the first programming token and determining, based on the second language model, that the request includes a second programming token corresponding to the second programming language, where the second mixture may be based on a second weight associated with the second programming token.

7. In some examples of the method, apparatuses, and non-transitory computer-readable medium described herein, executing or refraining from executing the request may include operations, features, means, or instructions for determining whether the first mixture satisfies a first threshold, determining whether the second mixture satisfies a second threshold, and executing or refraining from executing the request may be based on the first mixture satisfying the first threshold or the second mixture satisfying the second threshold, or both.

8. Some examples of the method, apparatuses, and non-transitory computer-readable medium described herein may further include operations, features, means, or instructions for determining the first threshold and the second threshold based on non-linear association between the first mixture and the second mixture.

9. Some examples of the method, apparatuses, and non-transitory computer-readable medium described herein may further include operations, features, means, or instructions for performing, at the software platform of the device, a training operation using a machine learning model, where the first language model and the second language model may be based on the training operation.

10. In some examples of the method, apparatuses, and non-transitory computer-readable medium described herein, the machine learning model includes a topic model.

11. Some examples of the method, apparatuses, and non-transitory computer-readable medium described herein may further include operations, features, means, or instructions for obtaining a first set of data associated with the first programming language and a second set of data associated with the second programming language and identifying a first set of programming tokens based on the first set of data and a second set of programming tokens based on the second set of data, where the first language model includes the first set of programming tokens and the second language model includes the second set of programming tokens.

12. Some examples of the method, apparatuses, and non-transitory computer-readable medium described herein may further include operations, features, means, or instructions for assigning a respective weight to each token of the first set of programming tokens based on a respective frequency at which each token of the first set of programming tokens occurs within the first set of data and assigning a respective weight to each programming token of the second set of programming tokens based on a respective frequency at which each programming token of the second set of programming tokens occurs within the second set of data.

13. In some examples of the method, apparatuses, and non-transitory computer-readable medium described herein, each programming token of the first set of programming tokens and the second set of programming tokens includes a keyword, an operator, or a delimiter.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for managing requests at a device, comprising:

performing, at a software platform of the device, a training operation using a machine learning model;

receiving, at the software platform of the device, a request associated with a first programming language;

determining a first threshold for a first mixture and a second threshold for a second mixture based at least in part on a non-linear association between the first mixture and the second mixture;

determining the first mixture associated with the request and whether the first mixture satisfies the first threshold, wherein the first mixture is based at least in part on a first language model corresponding to the first programming language and the first language model is based at least in part on the training operation;

determining the second mixture associated with the request and whether the second mixture satisfies the second threshold, wherein the second mixture is based at least in part on a second language model corresponding to a second programming language different from the first programming language and the second language model is based at least in part on the training operation; and executing or refraining from executing the request based at least in part on the first mixture satisfying the first threshold, the second mixture satisfying the second threshold, or both.

2. The method of claim 1, further comprising:

determining, based at least in part on the first language model and the second language model, whether the request includes a respective one or more programming tokens corresponding to the first programming language or the second programming language, or both, wherein determining the first mixture and the second mixture is based at least in part on whether the request includes the respective one or more programming tokens.

3. The method of claim 2, wherein determining whether the request includes the respective one or more programming tokens comprises:
   determining, based at least in part on the first language model, that the request includes a first programming token corresponding to the first programming language, wherein the first mixture is based at least in part on a first weight associated with the first programming token; and
   determining, based at least in part on the second language model, that the request includes a second programming token corresponding to the second programming language, wherein the second mixture is based at least in part on a second weight associated with the second programming token.

4. The method of claim 1, further comprising:
   obtaining a first set of data associated with the first programming language and a second set of data associated with the second programming language; and
   identifying a first set of programming tokens based at least in part on the first set of data and a second set of programming tokens based at least in part on the second set of data, wherein the first language model comprises the first set of programming tokens and the second language model comprises the second set of programming tokens.

5. The method of claim 4, further comprising:
   assigning a respective weight to each token of the first set of programming tokens based at least in part on a respective frequency at which each token of the first set of programming tokens occurs within the first set of data; and
   assigning a respective weight to each programming token of the second set of programming tokens based at least in part on a respective frequency at which each programming token of the second set of programming tokens occurs within the second set of data.

6. The method of claim 4, wherein each programming token of the first set of programming tokens and the second set of programming tokens comprises a keyword, an operator, or a delimiter.

7. The method of claim 1, wherein the machine learning model comprises a topic model.

8. An apparatus for managing requests at a device, comprising:
   a processor;
   memory coupled with the processor; and
   instructions stored in the memory and executable by the processor to cause the apparatus to:
      perform, at a software platform of the device, a training operation using a machine learning model;
      receive, at the software platform of the device, a request associated with a first programming language;
      determine a first threshold for a first mixture and a second threshold for a second mixture based at least in part on a non-linear association between the first mixture and the second mixture;
      determine the first mixture associated with the request and whether the first mixture satisfies the first threshold, wherein the first mixture is based at least in part on a first language model corresponding to the first programming language and the first language model is based at least in part on the training operation;
      determine the second mixture associated with the request and whether the second mixture satisfies the second threshold, wherein the second mixture is based at least in part on a second language model corresponding to a second programming language different from the first programming language and the second language model is based at least in part on the training operation; and
      execute or refrain from executing the request based at least in part on the first mixture satisfying the first threshold, the second mixture satisfying the second threshold, or both.

9. The apparatus of claim 8, wherein the instructions are further executable by the processor to cause the apparatus to:
   determine, based at least in part on the first language model and the second language model, whether the request includes a respective one or more programming tokens corresponding to the first programming language or the second programming language, or both, wherein determining the first mixture and the second mixture is based at least in part on whether the request includes the respective one or more programming tokens.

10. The apparatus of claim 9, wherein, to determine whether the request includes the respective one or more programming tokens, the instructions are executable by the processor to cause the apparatus to:
    determine, based at least in part on the first language model, that the request includes a first programming token corresponding to the first programming language, wherein the first mixture is based at least in part on a first weight associated with the first programming token; and
    determine, based at least in part on the second language model, that the request includes a second programming token corresponding to the second programming language, wherein the second mixture is based at least in part on a second weight associated with the second programming token.

11. The apparatus of claim 8, wherein the instructions are further executable by the processor to cause the apparatus to:
    obtain a first set of data associated with the first programming language and a second set of data associated with the second programming language; and
    identify a first set of programming tokens based at least in part on the first set of data and a second set of programming tokens based at least in part on the second set of data, wherein the first language model comprises the first set of programming tokens and the second language model comprises the second set of programming tokens.

12. The apparatus of claim 11, wherein the instructions are further executable by the processor to cause the apparatus to:
    assign a respective weight to each token of the first set of programming tokens based at least in part on a respective frequency at which each token of the first set of programming tokens occurs within the first set of data; and
    assign a respective weight to each programming token of the second set of programming tokens based at least in part on a respective frequency at which each programming token of the second set of programming tokens occurs within the second set of data.

13. The apparatus of claim 11, wherein each programming token of the first set of programming tokens and the second set of programming tokens comprises a keyword, an operator, or a delimiter.

14. The apparatus of claim 8, wherein the machine learning model comprises a topic model.

15. A non-transitory computer-readable medium storing code for managing requests at a device, the code comprising instructions executable by a processor to:
    perform, at a software platform of the device, a training operation using a machine learning model;
    receive, at the software platform of the device, a request associated with a first programming language;
    determine a first threshold for a first mixture and a second threshold for a second mixture based at least in part on a non-linear association between the first mixture and the second mixture;
    determine the first mixture associated with the request and whether the first mixture satisfies the first threshold, wherein the first mixture is based at least in part on a first language model corresponding to the first programming language and the first language model is based at least in part on the training operation;
    determine the second mixture associated with the request and whether the second mixture satisfies the second threshold, wherein the second mixture is based at least in part on a second language model corresponding to a second programming language different from the first programming language and the second language model is based at least in part on the training operation; and
    execute or refrain from executing the request based at least in part on the first mixture satisfying the first threshold, the second mixture satisfying the second threshold, or both.

16. The non-transitory computer-readable medium of claim 15, wherein the instructions are further executable by the processor to:
    determine, based at least in part on the first language model and the second language model, whether the request includes a respective one or more programming tokens corresponding to the first programming language or the second programming language, or both, wherein determining the first mixture and the second mixture is based at least in part on whether the request includes the respective one or more programming tokens.

17. The non-transitory computer-readable medium of claim 16, wherein, to determine whether the request includes the respective one or more programming tokens the instructions are executable by the processor to:
    determine, based at least in part on the first language model, that the request includes a first programming token corresponding to the first programming language, wherein the first mixture is based at least in part on a first weight associated with the first programming token; and
    determine, based at least in part on the second language model, that the request includes a second programming token corresponding to the second programming language, wherein the second mixture is based at least in part on a second weight associated with the second programming token.

18. The non-transitory computer-readable medium of claim 15, wherein the instructions are further executable by the processor to:
    obtain a first set of data associated with the first programming language and a second set of data associated with the second programming language; and
    identify a first set of programming tokens based at least in part on the first set of data and a second set of programming tokens based at least in part on the second set of data, wherein the first language model comprises the first set of programming tokens and the second language model comprises the second set of programming tokens.

19. The non-transitory computer-readable medium of claim 18, wherein the instructions are further executable by the processor to:
    assign a respective weight to each token of the first set of programming tokens based at least in part on a respective frequency at which each token of the first set of programming tokens occurs within the first set of data; and
    assign a respective weight to each programming token of the second set of programming tokens based at least in part on a respective frequency at which each programming token of the second set of programming tokens occurs within the second set of data.

20. The non-transitory computer-readable medium of claim 15, wherein the machine learning model comprises a topic model.

\* \* \* \* \*